(12) United States Patent
Stout et al.

(10) Patent No.: US 12,446,736 B2
(45) Date of Patent: Oct. 21, 2025

(54) FIELD TRIMMABLE RECEPTOR

(71) Applicant: Kohler Co., Kohler, WI (US)

(72) Inventors: Kenneth L. Stout, Sheboygan Falls, WI (US); Jose Luis Ortiz Palacios, Kohler, WI (US)

(73) Assignee: KOHLER CO., Kohler, WI (US)

( * ) Notice: Subject to any disclaimer, the term of this patent is extended or adjusted under 35 U.S.C. 154(b) by 98 days.

(21) Appl. No.: 18/334,800

(22) Filed: Jun. 14, 2023

(65) Prior Publication Data
US 2023/0320538 A1  Oct. 12, 2023

Related U.S. Application Data

(63) Continuation of application No. 17/242,713, filed on Apr. 28, 2021, now Pat. No. 11,712,135.

(60) Provisional application No. 63/018,291, filed on Apr. 30, 2020.

(51) Int. Cl.
*A47K 3/40* (2006.01)
*A47K 3/00* (2006.01)

(52) U.S. Cl.
CPC ............... *A47K 3/40* (2013.01); *A47K 3/008* (2013.01)

(58) Field of Classification Search
CPC .......... A47K 3/40; A47K 3/405; A47K 3/008
See application file for complete search history.

(56) References Cited

U.S. PATENT DOCUMENTS

| | | | |
|---|---|---|---|
| 5,140,789 A * | 8/1992 | De Gooyer | A47K 3/40 4/613 |
| D539,394 S | 3/2007 | Luxton | |
| 7,979,927 B2 | 7/2011 | Daniels | |
| 8,181,287 B2 * | 5/2012 | Luxton | A47K 3/40 4/613 |
| 8,230,535 B2 | 7/2012 | Kik et al. | |

(Continued)

FOREIGN PATENT DOCUMENTS

CN 110522331 12/2019

OTHER PUBLICATIONS

Amazon.com, "Cut-to-Fit 36"×60" (Left Drain) Tile Shower Base Kit", Internet URL: https://www.amazon.com/Tile-Shower-Base-Kit-Drain/dp/B073X3HV6L, first available Jul. 13, 2017.

(Continued)

*Primary Examiner* — Janie M Loeppke
(74) *Attorney, Agent, or Firm* — FOLEY & LARDNER LLP

(57) ABSTRACT

A method for installing a receptor in a shower environment includes measuring a distance between a drain of the shower environment and a wall of the shower environment. The method also includes identifying a marking on the receptor that corresponds to the distance. The marking indicates where to cut the receptor to remove a portion of a rim of the receptor such that an opening in the receptor aligns with the drain when the receptor is installed in the shower environment. The marking is identified from a plurality of different markings on the receptor, each of the plurality of different markings corresponding to a different distance. The method also includes cutting the receptor at a location indicated by the marking. The method also includes installing the receptor in the shower environment after cutting the receptor at the location indicated by the marking.

18 Claims, 9 Drawing Sheets

(56) References Cited

U.S. PATENT DOCUMENTS

| | | | |
|---|---|---|---|
| 8,596,021 B2 | 12/2013 | Van Ravenhorst | |
| 9,687,118 B2 | 6/2017 | Schindler | |
| 9,848,742 B2 | 12/2017 | Phillips | |
| 10,383,484 B2* | 8/2019 | Fraga | A47K 3/40 |
| 10,881,254 B1* | 1/2021 | Katwyk | B26D 3/08 |
| 2004/0205890 A1 | 10/2004 | Smale | |
| 2019/0191932 A1* | 6/2019 | Costello | A47K 3/40 |

OTHER PUBLICATIONS

Amazon.com, "Uni-Green Shower Pan Ready Tile 32"×48" Curbless Level Entry System ABS Glassfibre Reinforced Material Cut-to-Fit with center shower drain, Shower Base Slope and Tileable, Easy for Installation", Internet URL: https://www.amazon.com/Uni-Green-Curbless-Glassfibre-Reinforced-Installation/dp/B07SW9X25S/ref=sr_1_1?crid=1ADQSA7R3MY5G&keywords=Uni-GreenCurbless Ready to Tile Shower Pan%2FBase Cut-to-Fit 48%22X32%22 ABS Material with FibreglassReinforced&qid=1685026082&sprefix=%2Caps%2C7.

* cited by examiner

FIELD TRIMMABLE RECEPTOR

CROSS-REFERENCE TO RELATED PATENT APPLICATION

This application is a continuation of U.S. patent application Ser. No. 17/242,713, filed Apr. 28, 2021, which claims the benefit of and priority to U.S. Provisional Patent Application No. 63/018,291, filed Apr. 30, 2020. The entire disclosures of U.S. patent application Ser. No. 17/242,713 and U.S. Provisional Patent Application No. 63/018,291 are incorporated by reference herein.

BACKGROUND

The present disclosure relates generally to plumbing receptors. More specifically, the present disclosure relates to a field trimmable shower or bathing receptor.

Generally speaking, most shower or bathing receptors must be installed into an opening that is the same size as the receptor. Shower or bathing receptors are often required to be custom made to fit the dimensions of a specific opening, which is expensive and time consuming. If the custom made shower or bathing receptor is incorrectly sized (e.g. the shower receptor is too large for the opening), a new shower or bathing receptor must be manufactured.

Shower or bathing receptors are often required by plumbing codes to have a flange located on the sides of the shower or bathing receptor that are adjacent to a wall of the opening in which the shower or bathing receptor is installed. Most conventional shower or bathing receptors have integrally molded flanges on the shower or bathing receptor on the sides that are adjacent to a wall. With an integrally molded flange, the shower or bathing receptor must be custom made for the opening in which the shower or bathing receptor is installed.

SUMMARY

One embodiment of the present disclosure relates to a shower system for use in a shower environment. The shower system includes a receptor. The receptor includes a fluid collection area and a rim. The fluid collection area includes a base forming a bottom surface of the fluid collection area and an opening extending through the base to allow water to drain from the fluid collection area via the opening. The rim extends outward from the fluid collection area along at least a portion of a perimeter of the fluid collection area. The rim includes a resizing feature configured to facilitate removing a portion of the rim to change a size of the receptor in one or more dimensions.

In some embodiments, the rim may include a first rim and a second rim. The first rim can be coupled to a first side of the fluid collection area and extends outward from the first side in a first direction. The second rim can be coupled to a second side of the fluid collection area and extends outward from the second side in a second direction substantially perpendicular to the first direction. In some embodiments, the resizing feature may include a first resizing feature and a second resizing feature. The first resizing feature may be located along the first rim and can be configured to facilitate removing a portion of the first rim to change the size of the receptor in a first dimension aligned with the first direction. The second resizing feature may be located along the second rim and can be configured to facilitate removing a portion of the second rim to change the size of the receptor in a second dimension aligned with the second direction.

In some embodiments, the rim may include a top surface that can extend outward from the fluid collection area and a side wall that may be substantially perpendicular to the top surface and can be coupled to the top surface along a shared edge. The top surface and the side wall may at least partially define a concave region within the rim. The shower system may further include a beam within the concave region within the rim.

In some embodiments, the shower system further includes a flange that may be coupled to the rim and can form a watertight seal between the rim and a wall of the shower environment. In some embodiments, the flange can include one or more sections of aluminum positioned along an edge of the rim. In some embodiments, the flange may be a unitary component that can include two or more linear sections and one or more corners that may join the two or more linear sections.

In some embodiments, the base forming the bottom surface of the fluid collection area may be substantially conical sloping downward toward the opening to bias the water toward the opening.

In some embodiments, the shower system can include the rim and the bias forming the bottom surface of the fluid collection area. The rim can include a first rim that may extend outward from a first edge of the fluid collection area and a second rim that may extend outward from a second edge of the fluid collection area. The bias forming the fluid collection area may be sloped toward the opening such that a first distance between the first edge and the base may be greater than a second distance between the second edge and the base.

In some embodiments, the resizing feature can include one or more markings indicating where to cut the rim to remove the portion of the rim to change the size of the receptor.

Another example embodiment relates to a receptor for use in a shower environment. The receptor includes a fluid collection area and a rim. The fluid collection area includes a base forming a bottom surface of the fluid collection area and an opening extending through the base to allow water to drain from the fluid collection area via the opening. The rim extends outward form the fluid collection area along at least a portion of a perimeter of the fluid collection area. The rim includes a resizing feature configured to facilitate removing a portion of the rim to change a size of the receptor in one or more dimensions.

In some embodiments, the rim may include a first rim and a second rim. The first rim can be coupled to a first side of the fluid collection area and may extend outward from the first side in a first direction. The second rim may be coupled to a second side of the fluid collection area and may extend outward from the second side in a second direction substantially perpendicular to the first direction. In some embodiments, the resizing feature may include a first resizing feature and a second resizing feature. The first resizing feature may be located along the first rim and can be configured to facilitate removing a portion of the first rim to change the size of the receptor in a first dimension aligned with the first direction. The second resizing feature may be located along the second rim and can be configured to facilitate removing a portion of the second rim to change the size of the receptor in a second dimension aligned with the second direction.

In some embodiments, the rim may include a top surface that can extend outward from the fluid collection area and a side wall that may be substantially perpendicular to the top surface and can be coupled to the top surface along a shared edge. The top surface and the side wall may at least partially define a concave region within the rim. The shower system may further include a beam within the concave region within the rim.

In some embodiments, the receptor may further include a flange coupled to the rim. The flange may form a watertight seal between the rim and a wall of the shower environment.

In some embodiments, the base forming the bottom surface of the fluid collection area may be substantially conical sloping downward toward the opening to bias the water toward the opening.

In some embodiments, the receptor may include the rim and the bias forming the bottom surface of the fluid collection area. The rim may include a first rim that can extend outward form a first edge of the fluid collection area and a second rim that can extend outward from a second edge of the fluid collection area. The bias forming the bottom surface of the fluid collection area may be sloped toward the opening such that a first distance between the edge and the base may be greater than a second distance between the second edge and the base.

In some embodiments, the resizing feature may include one or more markings indicating where to cut the rim to remove the portion of the rim to change the size of the receptor.

Another example embodiment relates to a method for installing a receptor in a shower environment. The method includes measuring a distance between a drain of the shower environment and a wall of the shower environment. The method further includes identifying a marking on the receptor that corresponds to the distance. The marking indicates where to cut the receptor to remove a portion of a rim of the receptor such that an opening in the receptor aligns with the drain when the receptor is installed in the shower environment. The marking is identified from a plurality of different markings on the receptor, each of the plurality of different markings corresponding to a different distance. The method further includes cutting the receptor at a location indicated by the marking. The method further includes installing the receptor in the shower environment after cutting the receptor at the location indicated by the marking.

In some embodiments, the method may further include coupling a flange to the rim of the receptor. The flange may provide a watertight seal between the rim and the wall of the shower environment.

BRIEF DESCRIPTION OF THE DRAWINGS

The disclosure will become more fully understood from the following detailed description, taken in conjunction with the accompanying FIGURES, wherein like reference numerals refer to like elements.

DETAILED DESCRIPTION

Before turning to the FIGURES, which illustrate certain exemplary embodiments in detail, it should be understood that the present disclosure is not limited to the details or methodology set forth in the description or illustrated in the FIGURES. It should also be understood that the terminology used herein is for the purpose of description only and should not be regarded as limiting.

Generally speaking, most conventional shower or bath receptors are custom manufactured to the dimensions of a specific opening. Furthermore, if the receptors are sized improperly (e.g. the receptor is too large to fit into the opening), a new receptor has to be manufactured. Plumbing codes often require a flange on the edges of shower or bath receptors that are adjacent to a wall of the opening in which the shower or bathing receptor is installed. Most conventional shower or bath receptors have an integrally molded flange on the edges of the shower or bathing receptor that are adjacent to the wall of an opening in which the shower or bathing receptor is installed.

Referring generally to the FIGURES, disclosed herein are various embodiments of shower receptors that are trimmable to a variety of dimensions to allow the shower receptor to fit into multiple different sized openings. This eliminates the need to manufacture custom sized receptors, along with the cost and time associated According to an exemplary embodiment, the shower receptor has a plurality of sidewalls, each sidewall coupled to a rim with a width. At least one sidewall is coupled to a first rim with a first width. At least one sidewall is coupled to a second rim with a second width, the second width being larger than the first width. The sidewall with the second width (i.e. the wider rim) can be trimmed down such that the sidewall has a new width (e.g., a third width), which is less than the second width. Notably, the width of multiple rims can be trimmed. According to various exemplary embodiments, the shower receptor may be trimmed using conventional hand tools (e.g. a circular saw, a jigsaw, an angle grinder, a handsaw, etc.). In one embodiment, the receptor 100 is made of a material that includes a thermoformed acrylic. In other embodiments, the material of the receptor 100 includes a thermoformed acrylic strengthened with wood and/or fiberglass, which was shown to advantageously balance ease of cutting with strength. Notably, the other receptors of this application may include other materials. Each of the trimmable edges are configured to be coupled to a flange. The flange is coupled to the shower receptor by a fastener, which can include a nail, a screw, silicone, an adhesive, etc., or any combination thereof.

Figure 1:
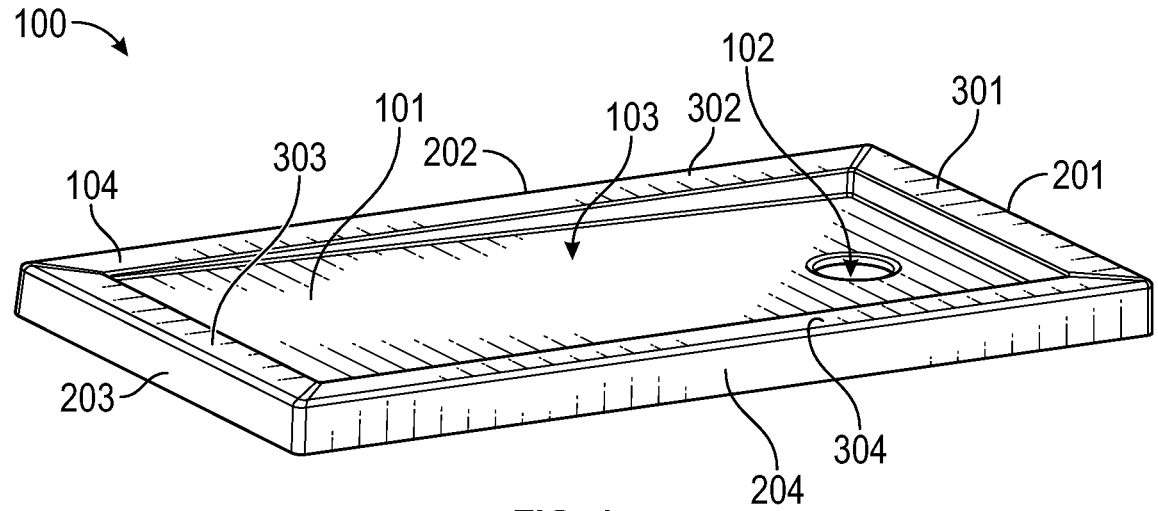
FIG. 1 is a perspective view of a shower receptor, according to an exemplary embodiment.

FIG. 1 illustrates a shower receptor 100 according to an exemplary embodiment. The shower receptor 100 includes a base 101, which has an opening 102 (e.g., a cutout), and a plurality of sidewalls 201-204 extending substantially perpendicular from the base 101. The base 101 is substantially a single piece. As shown, the base 101 has a rectangular profile, and the plurality of sidewalls 201-204 surrounds the base 101. In other exemplary embodiments, the profile of the base 101 may be any geometric shape (e.g. a circle, a square, a triangle, etc.). The opening 102 is configured to be a circular cutout that may allow liquid (e.g., water, etc.) to pass through. In some embodiments, the opening 102 may resemble any geometric shape. By way of example, the opening 102 may include a grate, where the grate is configured to catch large objects and prevent them from passing through the opening 102.

The illustrated plurality of sidewalls 201-204 are shown to include a first sidewall 201, a second sidewall 202, a third sidewall 203, and a fourth sidewall 204, each coupled to a different edge of a rim 104. The plurality of sidewalls 201-204 may be further defined to be the outmost walls positioned along the outer perimeter of the shower receptor 100. In some embodiments, the plurality of sidewalls 201-204 (e.g., first sidewall 201, second sidewall 202, third sidewall 203, and fourth sidewall 204) may be configured along at least one of the edges of the rim 104. The rim 104 may be configured to define a boundary of a fluid collection area 103, where the fluid collection area 103 can be configured to receive a fluid. The base 101 is sloped such that when the fluid collection area 103 receives the fluid, the fluid flows towards the opening 102, and exits the fluid collection area 103 through the opening 102. By way of example, the slope in the fluid collection area 103 is configured to be conical such that the fluid collection area does not contain seams. In some embodiments, the fluid collection area 103 includes sloping panels, where the panels include seams that extend between the opening 102 and the rim 104 such to form a pyramidical structure (e.g., trapezoidal planar panels that slope downward toward the opening 102). The fluid collection area 103 defines a smooth surface for a user to stand on while bathing. In some embodiments, the fluid collection area 103 may define a textured surface such to provide the user with grip when using the shower environment.

The rim 104 is configured to extend along at least a portion of the entire perimeter of the fluid collection area 103. In some embodiments, the rim 104 may extend along the entire perimeter of the fluid collection area 103. In still some embodiments, the shower receptor 100 includes a plurality of the rims 104 positioned along the edge of the fluid collection area 103. The rim 104 is coupled to at least one of the plurality of sidewalls 201-204, and the rim 104 extends a first width outward and away from the base 101, such that the rim 104 is coupled to at least one of the top edges of the plurality of sidewalls 201-204 after extending away from the base 101. In some embodiments, the rim 104 extends outward and upward at an upward angle relative to a top edge of the sidewall, such that fluid will flow down the rim 104 and onto the base 101. By way of example, the fluid collection area 103 may be positioned proximal to the rim 104 along at least one of the plurality of sidewalls 201-204. In some embodiments, the rim 104 is substantially perpendicular to the sidewall.

The rim 104 is configured such that it may be trimmed to a second width, the second width being less than the first width. The rim 104 may be trimmed from the first width to the second width by cutting material away from the rim 104 using a conventional hand tool (e.g., a circular saw, a jigsaw, an angle grinder, a handsaw, etc.). In some embodiments, the rim 104 is further configured to flex such that the rim 104 can be bent after trimming. The flex allows for the rim 104 to bend downward and fasten the rim 104 to a floor below the shower receptor 100. The rim 104 may flex at an angle (e.g., 2 degrees), while still maintaining a rigid structure. As shown, the shower receptor 100 includes a first rim 301 associated with the first sidewall 201, a second rim 302 associated with the second sidewall 202, a third rim 303 associated with the third sidewall 203, and a fourth rim 304 associated with the fourth sidewall 204. The first rim 301 is coupled to the first sidewall 201, the second rim 302 is coupled to the second sidewall 202, the third rim 303 is coupled to the third sidewall 203, and the fourth rim 304 is coupled to the fourth sidewall 204.

The shower receptor 100 is configured to be manufactured using thermoformed acrylic. In some embodiments, alternate methods of manufacturing (e.g., plastic extrusion, plastic bending, injection molding, etc.) may be used to create the shower receptor 100. In some embodiments, alternate materials (e.g., metal, ceramics, glass, etc.) may be used to manufacture the shower receptor 100.

Figure 2A:
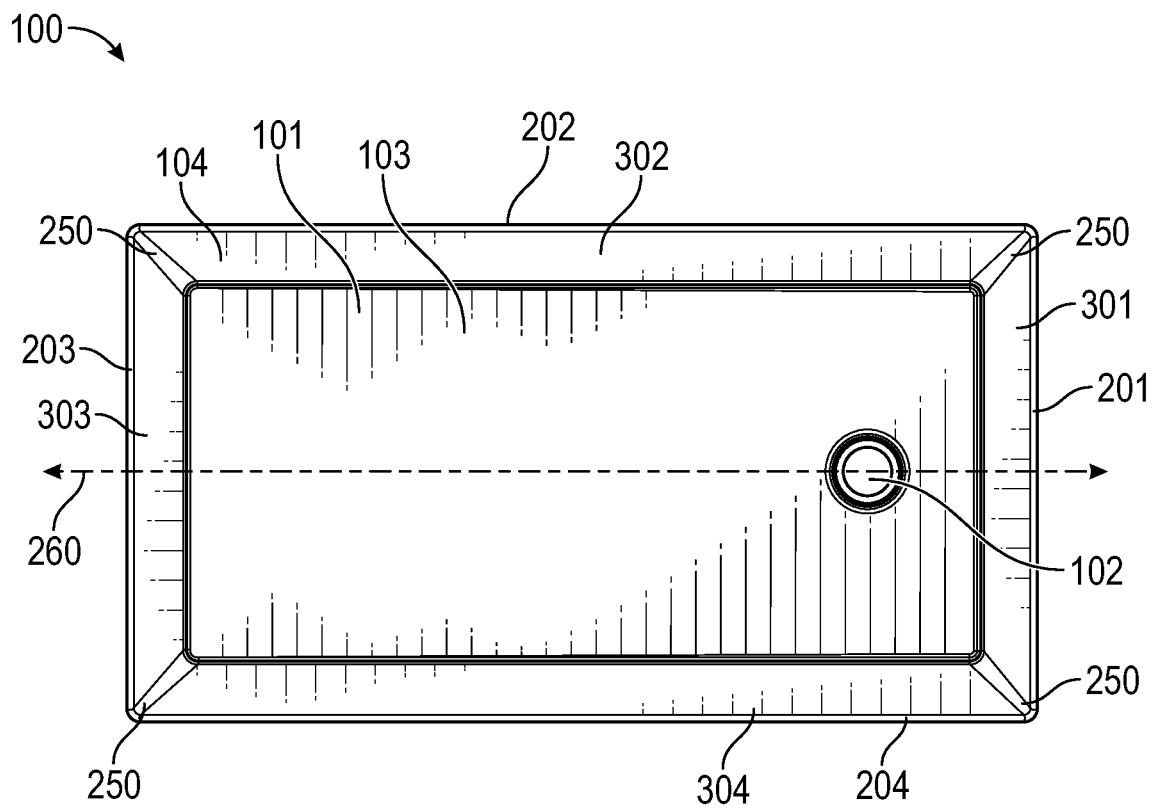
FIG. 2A is a top view of the shower receptor of FIG. 1, according to an exemplary embodiment.
Figure 3:
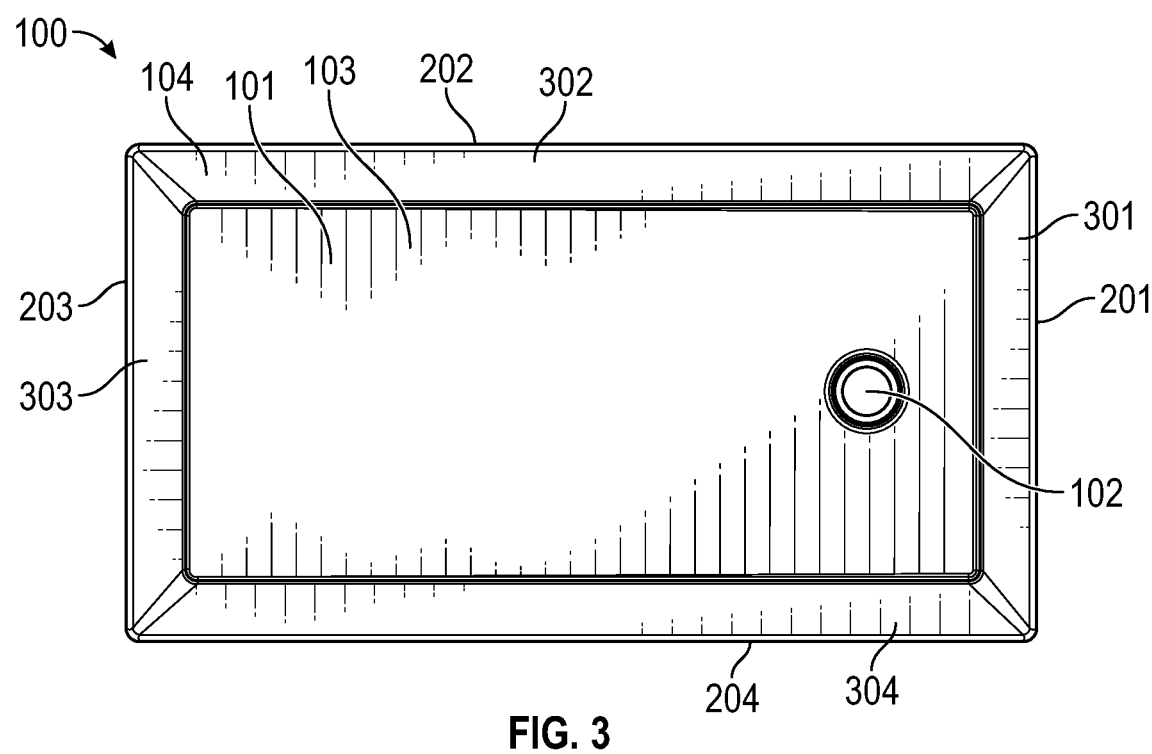
FIG. 3 is a bottom view of the shower receptor of FIG. 1, according to an exemplary embodiment.

Referring to FIGS. 2A and 3, a top view and a bottom view of the shower receptor 100 of FIG. 1 is shown. The rim 104 may be configured along the entire perimeter of the base 101. The plurality of rims 104 (e.g., first rim 301, second rim 302, third rim 303, and fourth rim 304) are coupled together by rim seams 250. The rim seams 250 may be configured to be positioned between at least a set of rims 104 (e.g., first rim 301 and second rim 302, etc.). By way of example, the rims 104 may be a single piece coupled to the base 101, where the rim seam 250 may be configured as a transition. In some embodiments, the plurality of rims 104 may be coupled together at the rim seams 250, where the rims 104 may include locking mechanisms (e.g., joint, latch, tongue and groove, etc.).

The shower receptor 100 further includes a horizontal axis 260 disposed along the base 101. The horizontal axis 260 is disposed along the midpoint of the shower receptor 100 such that the horizontal axis 260 may be equidistant to both the second sidewall 202 and the fourth sidewall 204. In some embodiments, the horizontal axis 260 may be equidistant to any configuration of the plurality of sidewalls 201-204. In still some embodiments, the horizontal axis 260 may not be disposed along the midpoint of the shower receptor 100 such that the horizontal axis 260 may be positioned proximal to at least one of the plurality of sidewalls 201-204. The opening 102 is positioned along the horizontal axis 260 such that the midpoint of the opening 102 is disposed along the horizontal axis 260. In some embodiments, the opening 102 may be positioned offset the horizontal axis 260.

Figure 4:
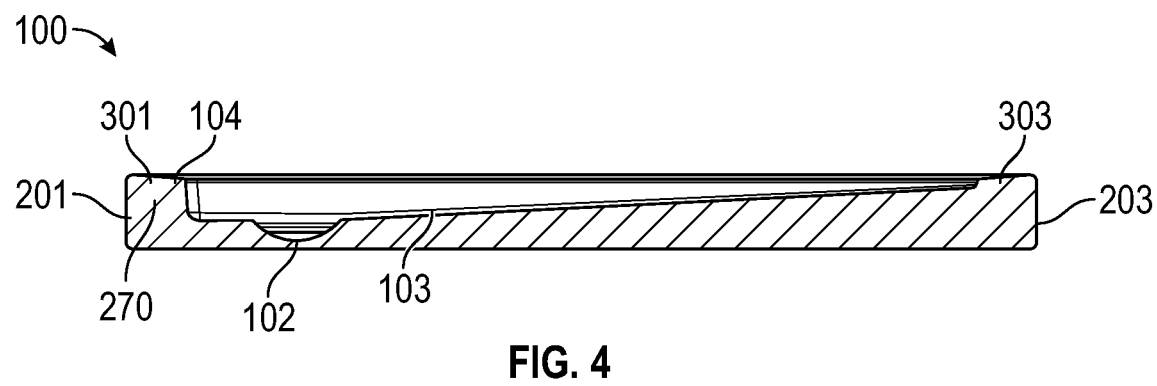
FIG. 4 is a detailed, side view of the shower receptor of FIG. 1, according to an exemplary embodiment.

The opening 102 is configured to be positioned proximal to the first sidewall 201 along the horizontal axis 260. By way of example, the opening 102 may be placed in the center of the shower receptor 100 such that the opening 102 is equidistant to the first sidewall 201 and the third sidewall 203 and equidistant to the second sidewall 202 and the fourth sidewall 204. In some embodiments, the opening 102 may be positioned proximal to at least one of the plurality of sidewalls 201-204 (e.g., first sidewall 201, second sidewall 202, third sidewall 203, and fourth sidewall 204). In such an embodiment, the fluid collection area 103 remains biased towards the opening 102 such that water may continuously flow towards it. In still some embodiments, the shower receptor 100 may include a plurality of openings 102 positioned within the fluid collection area 103. Referring now to FIG. 4, a detailed, side view of the shower receptor 100 of FIG. 1 is shown. The rim 104 includes a concave region, shown as rim interface 270. The rim interface 270 is configured to be a portion of the rim 104 disposed underneath the rim 104 and positioned between the fluid collection area 103 and the plurality of sidewalls 201-204. The rim interface 270 is disposed along the entirety of the rim 104. In some embodiments, the rim interface 270 may only be positioned within a portion of the rim 104. By way of example, the rim 104 may be cut such that only a portion of the rim 104 may include a rim interface 270. The rim 104 may include the rim interface 270 to minimize weight of the receptor 100 by eliminating excess material.

Referring still to FIG. 4, the fluid collection area 103 is configured to slope substantially towards the opening 102. The opening 102 is configured to be positioned at the lowest location of the slope such that liquid (e.g., water) may flow towards the opening 102. In some embodiments, the opening 102 may not be positioned at the lowest location of the slope. The fluid collection area 103 is sloped such that the distance between the rim 104 and the fluid collection area 103 may vary along different positions in the shower receptor 100. By way of example, the distance between the first rim 301 and the fluid collection area 103 is greater than the distance between the third rim 303 and the fluid collection area 103. In some embodiments, any configuration of rim 104 to fluid collection area 103 distances may more or less than another. In still some embodiments, the distance between the rim 104 and the fluid collection area 103 may be the same around the entire length of the shower receptor 100.

Figure 5:
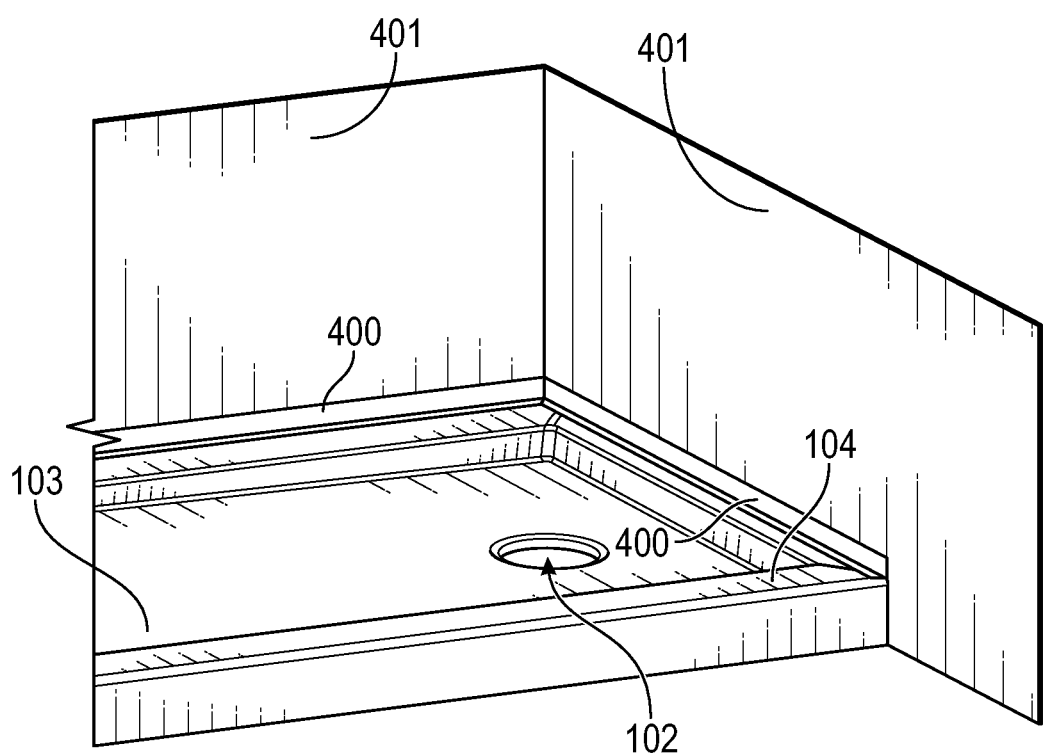
FIG. 5 is a perspective view of the shower receptor of FIG. 1, according to an exemplary embodiment.

Referring to FIG. 5, the shower receptor 100 further includes at least one flange 400, according to an exemplary embodiment. The flange 400 may be coupled to the rim by a fastener (e.g. nails, screws, silicone, adhesives, etc.). The fastener may further couple the rim 104 to a floor below the shower receptor 100. In some embodiments, a beam (e.g., a wooden beam) may be placed under the rim 104, and the fasteners couple the rim 104 to the beam. The flange 400 is configured to seal the edge of the rim and a wall 401 of an opening containing the shower receptor 100 such that fluid cannot flow between the rim 104 and the wall 401. The flange 400 may be fastened to the rim 104, after the rim 104 is trimmed from the first width (e.g., original width) to the second width (e.g., trimmed width), with the edge of the flange 400 lining up with the second width. The flange 400 may also be fastened to the rim 104, without the rim 104 being trimmed, with the flange 400 lining up with the first width. In some exemplary embodiments, at least one flange 400 is molded into the rim 104. The rim 104 may be trimmed at an angle, such that the second width may be configured to have a varying length along the length of the rim 104. As such, the shower receptor 100, may be trimmed to fit in openings that are not square (i.e., 90 degree corners). By way of example, the shower receptor 100 may be trimmed such to create a customizable shower receptor 100. The customizable shower receptor is configured to be installed into a plurality of different shower designs and dimensions.

The overall size of the shower receptor 100 without the flange 400 defines a length of approximately 59⅞ inches and a width of approximately 32½ inches. In some embodiments, the shower receptor 100 may be configured to have dimensions greater or less than those in the disclosed embodiment. The shower receptor 100 may be trimmed such that the overall size of the shower receptor 100 with the flange 400 may define a length range of approximately between 55 3/16 inches and 60 inches and a width range of approximately between 30 inches and 32 9/16 inches. The flange 400 is configured to be cut to appropriate lengths of the sidewalls and may further be positioned on sidewalls that contain a corresponding wall 401.

Figure 2B:
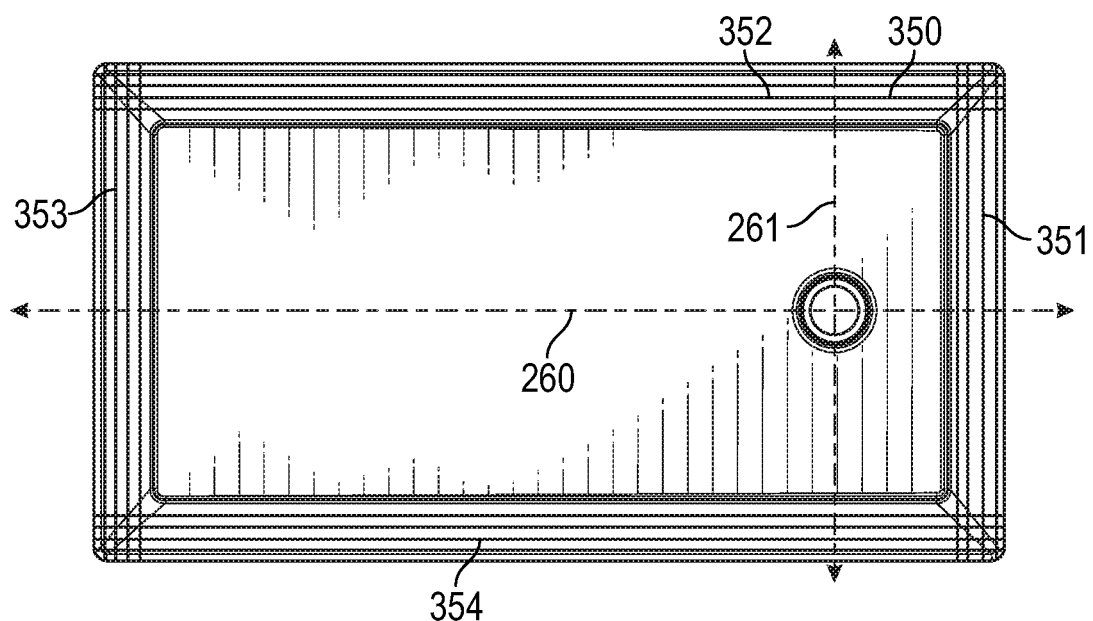
FIG. 2B is a top view of the shower receptor of FIG. 1 including increment markings, according to an exemplary embodiment.

As shown in FIG. 2B, the rim 104 may further contain a resizing feature. The resizing feature may be defined as being any feature that facilitates trimming the rim 104 (e.g., increment markings indicating where to cut, material coupled to the rim interface 270 that enable to rim 104 to be trimmed at any location or angle within the rim 104 while still providing support, etc.). The resizing feature is further defined to be increment markings 350. The increment markings 350 are further configured to be measurements that allow an installer to make accurate flange 400 cuts. In some embodiments, the increment markings 350 indicate distances relative to the center of the opening 102. By way of example, the increment markings 350 may indicate distances from the horizontal axis 260 and a vertical axis 261. The horizontal axis 260 and the vertical axis 261 may be configured to be disposed through the midpoint of the opening 102. In such an embodiment, this allows the installer to measure the distance from a floor drain to the walls 401 and then make the cuts along the corresponding markings in the rim 104 to ensure that the rim 104 is cut to the appropriate size for the opening 102 to be positioned directly above the floor drain. By way of example, the flange 400 is trimmed to the length that is shown from the increment markings 350 on the rim 104. To be more precise, the increment markings 350 along rims 302 and 304 (i.e., markings 352 and 354) may indicate the distance between the markings 352, 354 and the horizontal axis 260. Similarly, the increment markings 350 along rims 301 and 303 (i.e., markings 351 and 353) may indicate the distance between the markings 351, 353 and the vertical axis 261, where the vertical axis 261 is perpendicular to the horizontal axis 260. In some embodiments, the installer may make several cuts if the wall 401 is not perfectly square, such to align the shower receptor 100 perfectly in the shower environment. For example, if the shower environment is non-rectangular (i.e., the walls meet at non-right angles), the installer need not cut the rim 104 along a line parallel to axis 260 or axis 261, but rather may cut the rim 104 along a diagonal line that connects a first distance marking 350 (e.g., 4 inches) in one corner of the rim 104 with a second distance marking (e.g., 4.5 inches) in an adjacent corner of the rim 104 to align the edge of the rim 104 with the wall 401 when the wall 401 is not square with an adjacent wall.

The increment markings 350 may include a plurality of increment markings 351-354. The first rim 301 includes a first increment marking 351. The first increment marking 351 is defined to be a plurality of markings disposed along the entire length of the first rim 301 and positioned substantially parallel to the vertical axis 261. The second rim 302 includes a second increment marking 352. The second increment marking 352 is defined to be a plurality of markings disposed along the entire length of the second rim 302 and positioned substantially parallel to the horizontal axis 260. The third rim 303 includes a third increment marking 353. The third increment marking 353 is defined to be a plurality of markings disposed along the entire length of the third rim 303. The third increment marking 353 is positioned adjacent to the first increment marking 351 and positioned parallel to the vertical axis 261. The fourth rim 304 includes a fourth increment marking 354. The fourth increment marking 354 is defined to be a plurality of markings disposed along the entire length of the fourth rim 304. The fourth increment marking 354 is positioned adjacent to the second increment marking 352 and positioned parallel to the horizontal axis 261.

In various embodiments, the increment markings 351-354 may extend along the entire length of the corresponding rim 301-304 as shown in FIG. 2B and described above, or may be limited to only the corner regions of rims 301-304. In some embodiments, the increment markings 351-354 are visual indicators (e.g., black or colored lines or marks on a white background) that indicate where to cut using a cutting tool. In some embodiments, the increment markings 351-354 are notches or grooves in the surface of rims 301-304 that help the installer place the cutting tool or keep the cutting tool along the desired line throughout the length of the cut. In some embodiments, the increment markings 351-354 are configured to facilitate removing a desired portion of rims 301-304 without the use of a cutting tool. For example, the increment markings 351-354 may include perforated lines, notches, or grooves, configured to enable an installer to break away a portion of rims 301-304 manually without needing a cutting tool.

Figure 6:
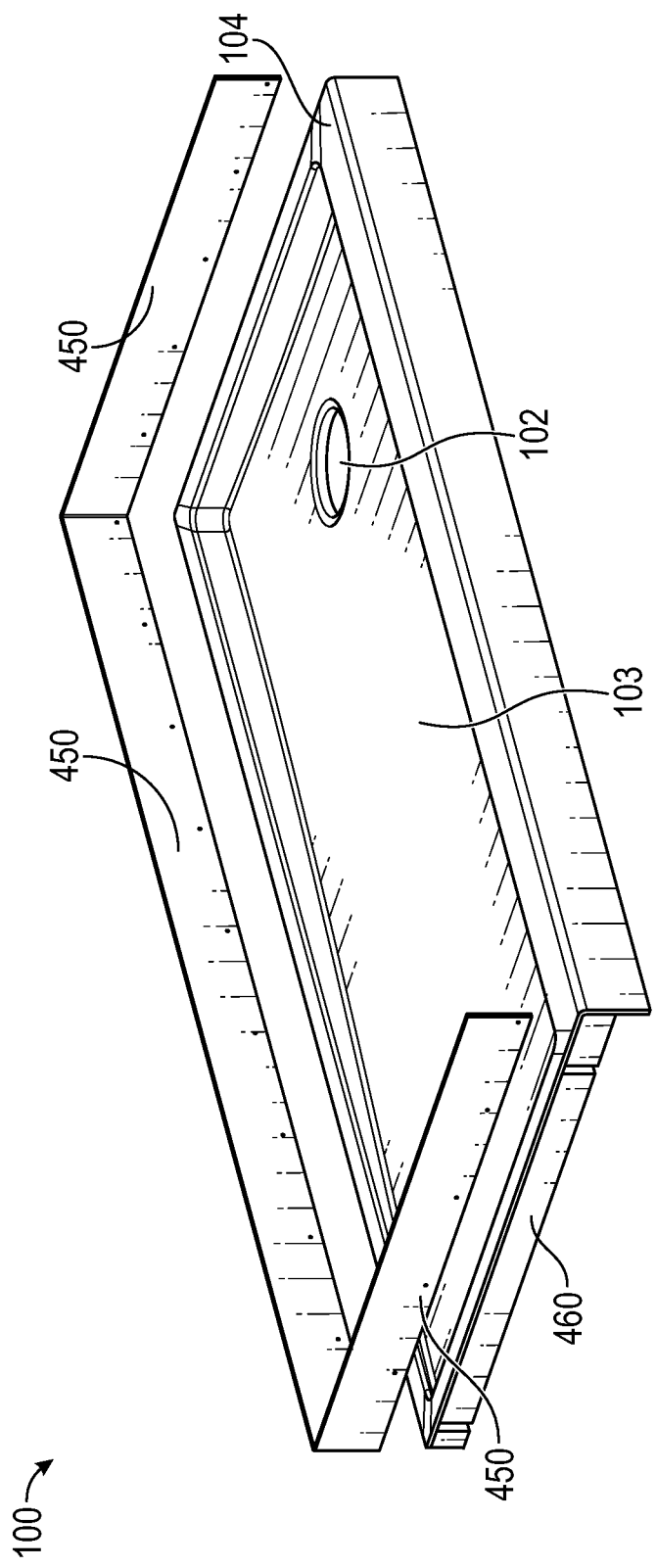
FIG. 6 is a detailed, perspective view of the shower receptor of FIG. 1, according to an exemplary embodiment.

Referring now to FIG. 6, a detailed, perspective view of the shower receptor 100 of FIG. 1 is shown, according to an example embodiment. The shower receptor 100 includes a flange 450 positioned around the perimeter of the shower receptor 100. The flange 450 is configured to be a singular module positioned along the perimeter of the shower receptor 100. In some embodiments, the flange 450 is configured to be assembled in sections, such that sections of the flange 450 may be assembled such to create the flange 450. The flange 450 is further configured to be an aluminum flange that is bent at appropriate lengths such to fit around the edge of the shower receptor 100. The flange 450 is configured to be positioned along any portion of the perimeter of the shower receptor 100. By way of example, the flange 450 may be positioned along any portion of the shower receptor 100 that abuts the wall 401. The shower receptor 100 includes the beam, shown as wood 460. The wood 460 is positioned under the rim 104 and abuts at least one of the plurality of sidewalls 201-204. The wood 460 may be coupled to the shower receptor 100 by an adhesive positioned between the wood 460 and the rim 104. In some embodiments, the wood 460 may be coupled to the shower receptor 100 by an alternate method such as fasteners. The wood 460 may be configured to provide an interface for the flange 450. The flange 450 is coupled to the wood 460 with construction screws. In some embodiments, the flange 450 may be coupled to the wood 460 with an alternate method (e.g., adhesive, pegs, fasteners, staples, etc.).

By way of example, the construction screws used to couple the flange 450 to the wood 460 may further penetrate at least one of the sidewalls. The shower receptor 100 may not include a trimmed sidewall such that the sidewall may be disposed between the flange 450 and the wood 460. In some embodiments, the sidewalls may be trimmed such to expose the wood 460. In such an embodiment, the flange 450 interfaces directly with the wood 460. Upon assembly of the flange 450, a silicon seal is disposed along the entire seaming edge of the shower receptor 100. The seaming edge is configured to be the edge between the rim 104 and the flange 450. By way of example, the seaming edge is only configured to be along sidewalls of the shower receptor 100 that may include a flange 450. The silicon seal completely seals the seaming edge to prevent water from leaking through. If water is able to leak through, the wood 460 may begin to rot or form mold such that the life of the shower receptor 100 may be substantially decreased. In some embodiments, alternate sealing methods may be utilized such to seal the seaming edge (e.g., rubber seals, gaskets, etc.).

Figure 7:
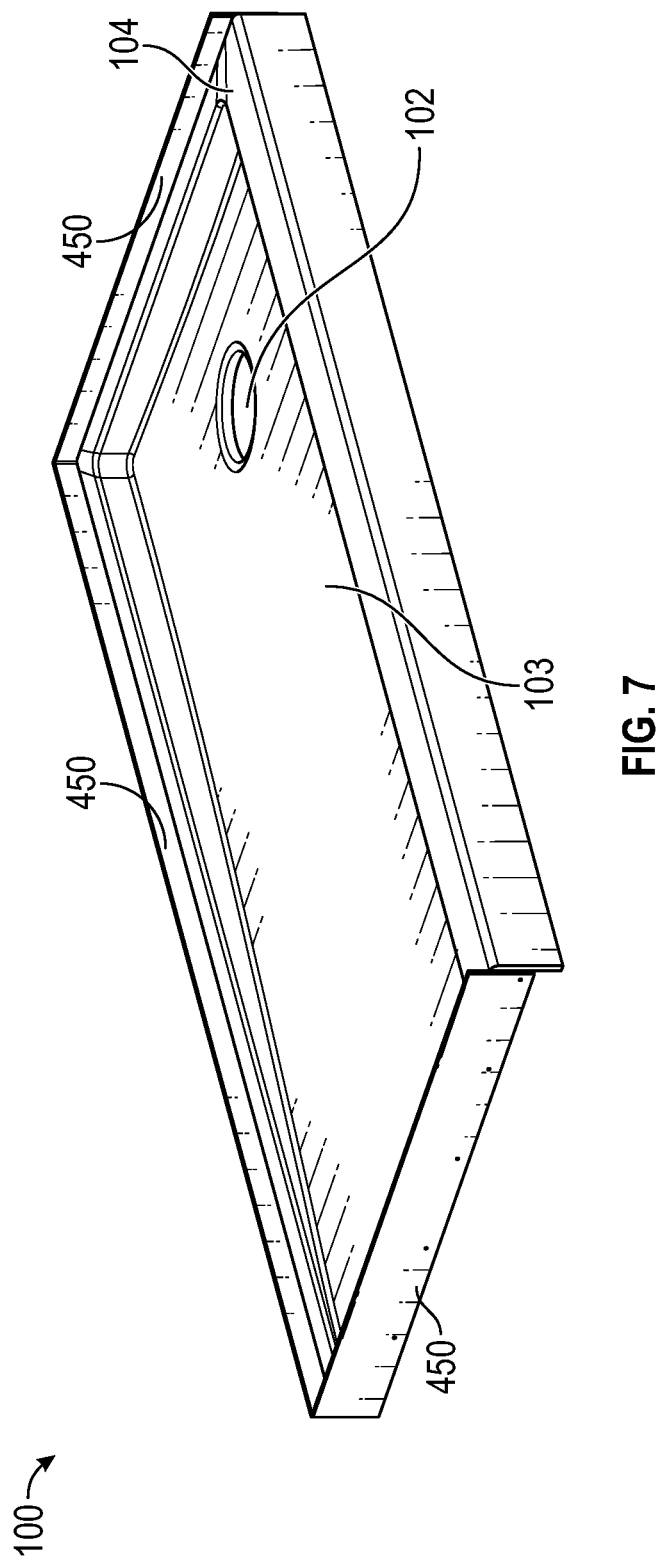
FIG. 7 is a perspective view of the shower receptor of FIG. 6, according to an exemplary embodiment.

Referring now to FIG. 7, a perspective view of the shower receptor 100 of FIG. 6 is shown. The flange 450 is coupled to shower receptor 100 by the fasteners. As shown, when the flange 450 is coupled to the shower receptor 100, the flange 450 may define a lip. The lip is configured to be at least a portion of the flange 450 positioned above the rim 104. The lip may vary in dimension based upon the installation of the shower receptor 100. In some embodiments, the lip may be configured to be the same length around the shower receptor 100. The lip is further defined to be at least 1 inch in length, where the length is defined between the rim 104 and the top of the flange 450.

The shower receptor 100 is configured to be a customizable shower receptor where at least one of the rims 104 (e.g., first rim 301, second rim 302, third rim 303, and fourth rim 304) may be trimmed such to alter the dimensions of the shower receptor 100. By way of example, the all of the rims 104 may be trimmed such to decrease both the length and the width of the shower receptor 100. The shower receptor 100 is configured such that the fluid collection area 103 may not be trimmed. In some embodiments, at least one of the plurality of sidewalls 201-204 (e.g., first sidewall 201, second sidewall 202, third sidewall 203, and fourth sidewall 204) may be trimmed such to decrease the height of the shower receptor 100. In such an embodiment, the sidewalls may not be trimmed such that the height of the sidewalls is less than the vertical distance of the opening 102 to the rim 104.

The shower receptor 100 may be installed into various types of shower environments. By way of example, the installer may measure a distance from the center of the floor drain to the edge of at least one of the walls 401. In some embodiments, the installer may only measure a distance from the center of the floor drain to the edge of one of the walls 401. The installer may identify the appropriate increment marking on the shower receptor 100, where the increment marking corresponds to the distance measured from the center of the floor drain to the edge of the walls 401. In some embodiments, the installer may identify multiple increment markings on the rim 104 such to make a trim line. Using the increment markings, the installer may then trim the shower receptor along the trim line, such to create a customizable shower receptor 100. The shower receptor 100 is now defined to be unique to a particular shower environment and may be placed into the shower environment. Once the shower receptor 100 has been placed into the shower environment, the flange 400 (e.g., flange 450) may be coupled to the shower receptor 100 and positioned between the shower receptor 100 and the wall 401. In some embodiments, the flange 400 (e.g., flange 450) may be coupled to the shower receptor 100 before the shower receptor 100 is installed into the shower environment.

Referring now to FIGS. 8-16, a plurality of shower configurations of the shower receptor 100 from a top view, according to exemplary embodiments. Each of the plurality of shower configurations are rectangular shaped and include a side A, a side B, a side C, and a side D. At least one rim of the shower receptor 100 can be trimmed from the first width to the second width, allowing the shower receptor 100 to be configured for installation in different sized and shaped openings. Depending on the configuration of the opening (e.g., shape, size, etc.) in which the shower receptor 100 is installed, an apron 600 may be installed on one or more sides of the shower receptor 100.

Figure 8:
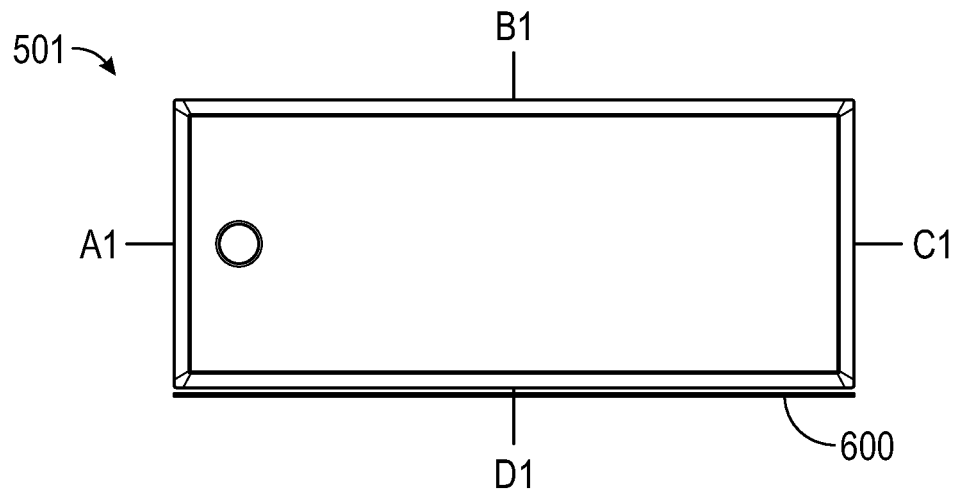
FIG. 8 is a top view of an exemplary embodiment of the shower receptor of FIG. 1 installed with shower walls, according to an exemplary embodiment.
Figure 9:
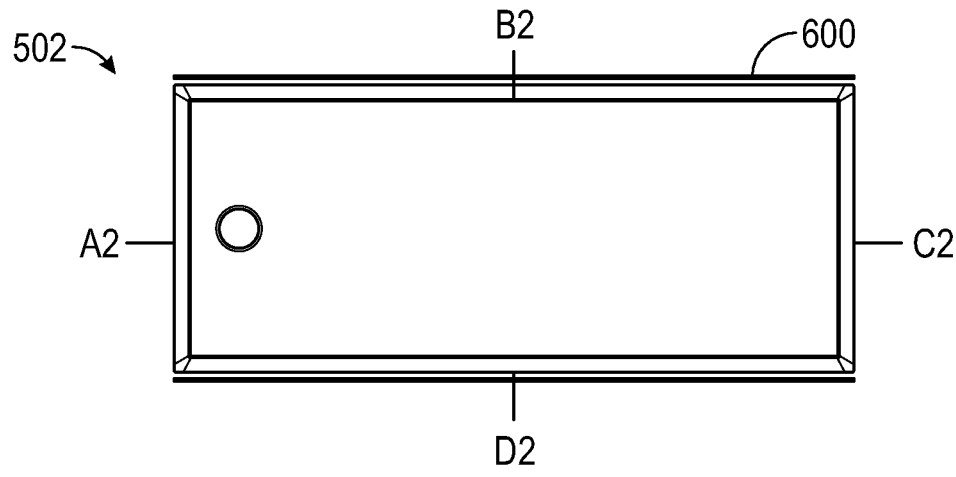
FIG. 9 is a top view of an exemplary embodiment of the shower receptor of FIG. 1 installed with shower walls, according to an exemplary embodiment.

For example, referring to a first configuration 501 shown in FIG. 8 and a second configuration 502 shown in FIG. 9, the shower receptor 100 may be installed into an opening with walls bordering three sides of the shower receptor 100, and the apron 600 on the side of the shower receptor 100 that is not bordering a wall. The first configuration 501 illustrates a configuration in which the shower receptor 100 is installed in an opening where walls are adjacent to side A1, side B1, and side C1, with side D1 configured to receive the apron 600. The second configuration 502 illustrates a configuration in which the shower receptor 100 is installed in an opening where walls are adjacent to side A2, side C2, and side D2, with side B2 configured to receive the apron 600.

Figure 10:
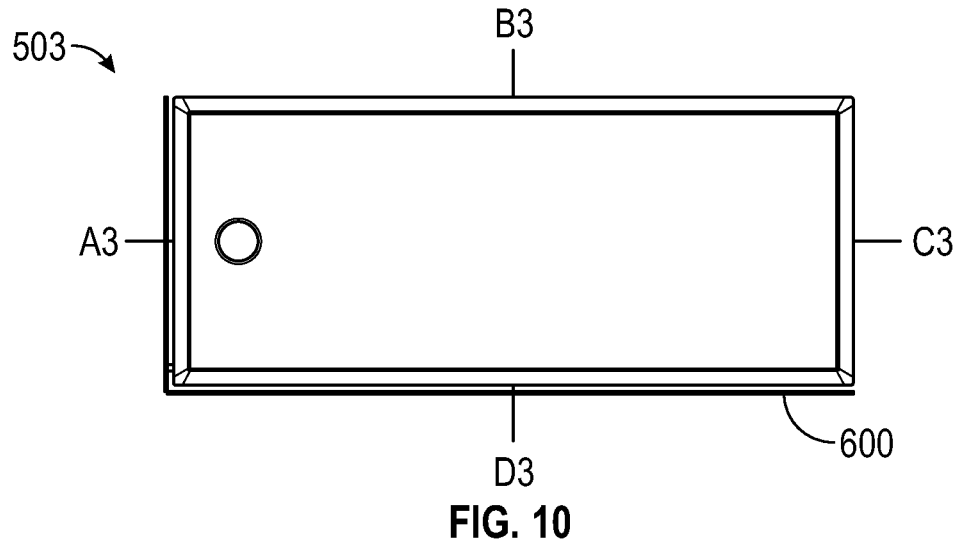
FIG. 10 is a top view of another configuration of the shower receptor of FIG. 1 installed with an apron, according to an exemplary embodiment.
Figure 11:
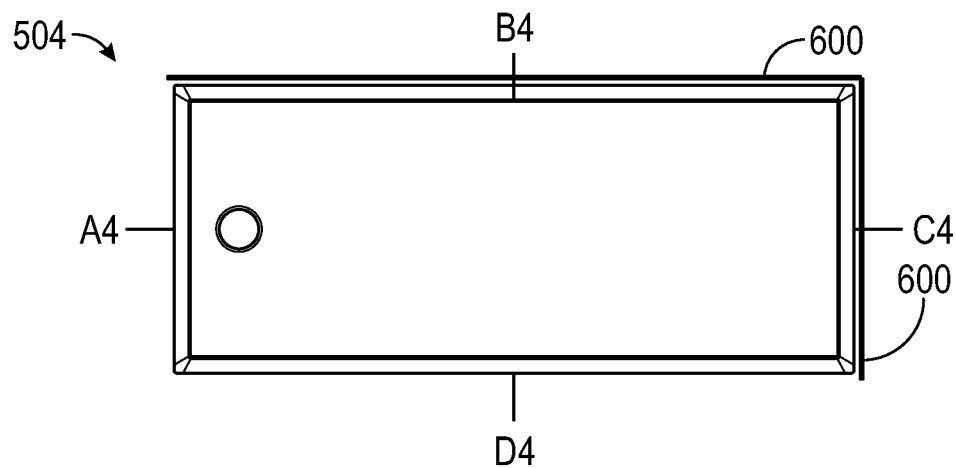
FIG. 11 is a top view of another configuration of the shower receptor of FIG. 1 installed with an apron, according to an exemplary embodiment.
Figure 12:
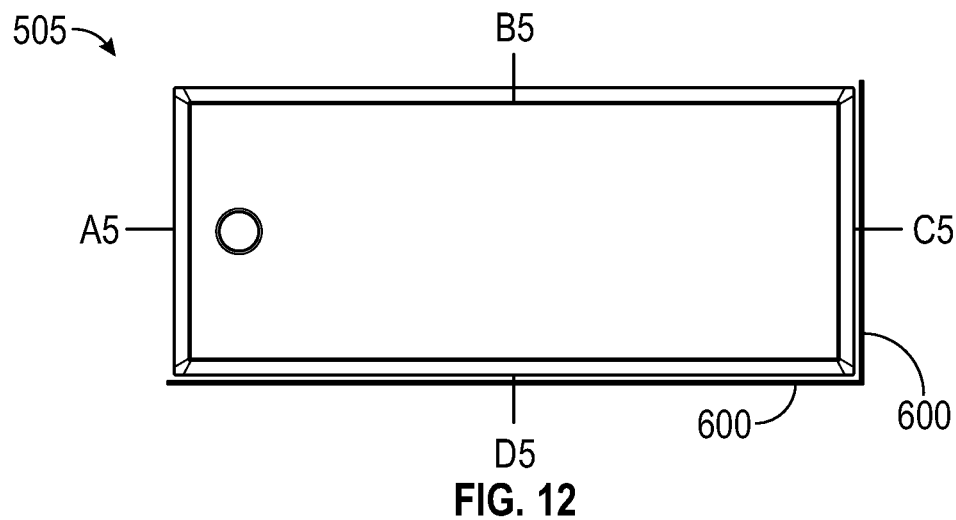
FIG. 12 is a top view of another configuration of the shower receptor of FIG. 1 installed with an apron, according to an exemplary embodiment.
Figure 13:
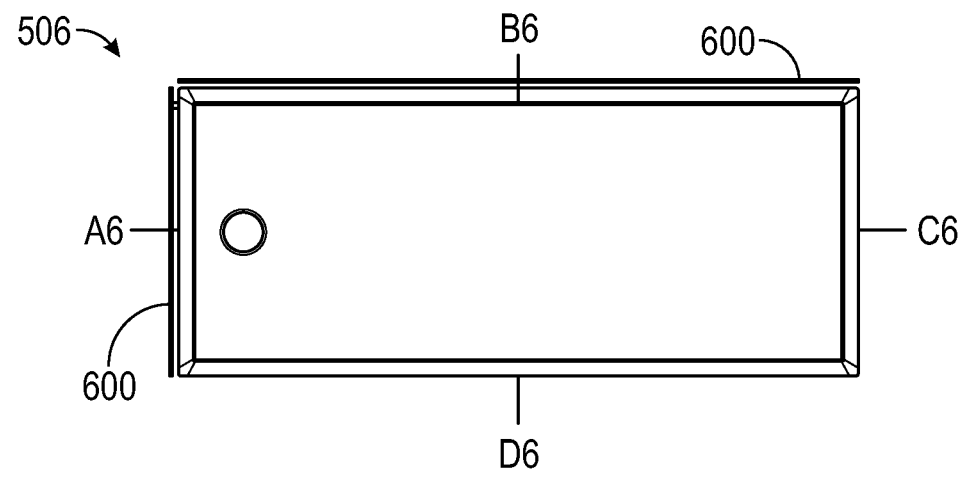
FIG. 13 is a top view of another configuration of the shower receptor of FIG. 1 installed with an apron, according to an exemplary embodiment.

Referring to a third configuration 503 shown in FIG. 10, a fourth configuration 504 shown in FIG. 11, a fifth configuration 505 shown in FIG. 12, and a sixth configuration 506 shown in FIG. 13, the shower receptor 100 may be installed in an opening with walls bordering two sides of the shower receptor 100 (e.g. a corner). The third configuration 503 illustrates a configuration in which the shower receptor 100 is installed in an opening where walls are adjacent to side B3 and side C3, with side A3 and side B3 each configured to receive an apron 600. The fourth configuration 504 illustrates a configuration in which the shower receptor 100 is installed in an opening where walls are adjacent to side A4 and side D4, with side B4 and side C4 each configured to receive an apron 600. The fifth configuration 505 illustrates a configuration in which the shower receptor 100 is installed in an opening where walls are adjacent to side A5 and side B5, with side C5 and side D5 each configured to receive an apron 600. The sixth configuration 506 illustrates a configuration in which the shower receptor 100 is installed in an opening where walls are adjacent to side C6 and side D6, with side A6 and side B6 each configured to receive an apron 600.

Figure 14:
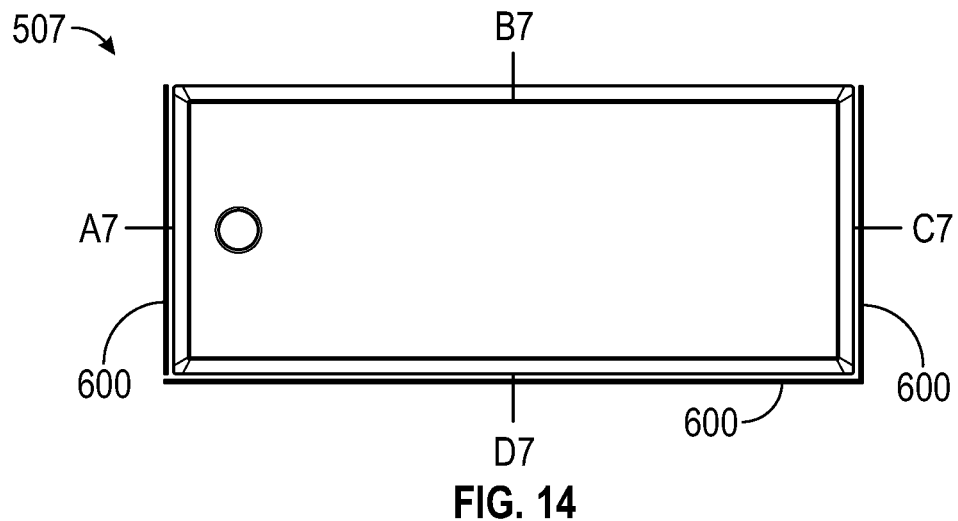
FIG. 14 is a top view of another configuration of the shower receptor of FIG. 1 installed with an apron, according to an exemplary embodiment.
Figure 15:
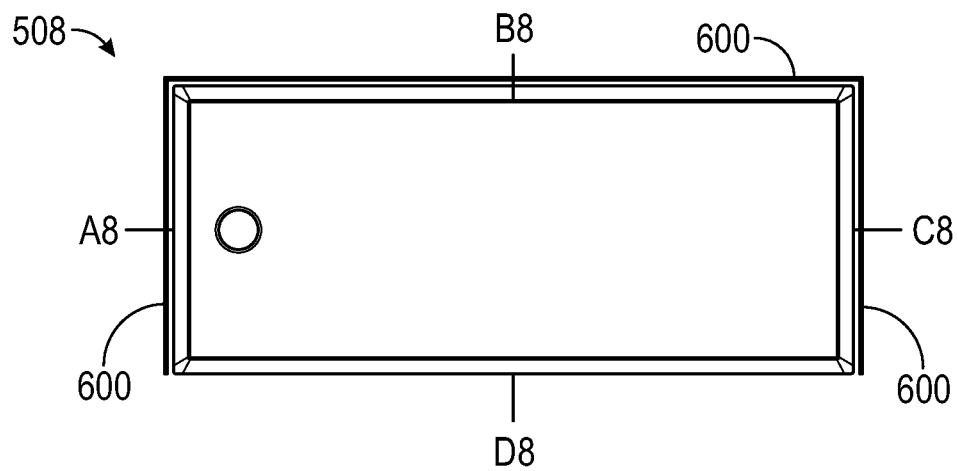
FIG. 15 is a top view of another configuration of the shower receptor of FIG. 1 installed with an apron, according to an exemplary embodiment.

Referring to a seventh configuration 507 shown in FIG. 14 and an eighth configuration 508 shown in FIG. 15, the shower receptor 100 may be installed in an opening with walls bordering one side of the shower receptor 100. The seventh configuration 507 illustrates a configuration in which the shower receptor 100 is installed in an opening where a wall is adjacent to side B7, with side A7, side C7, and side D7 each configured to receive an apron 600. The eighth configuration 508 illustrates a configuration in which the shower receptor 100 is installed in an opening where a wall is adjacent to side D8, with side A8, side B8, and side C8 each configured to receive an apron 600.

Figure 16:
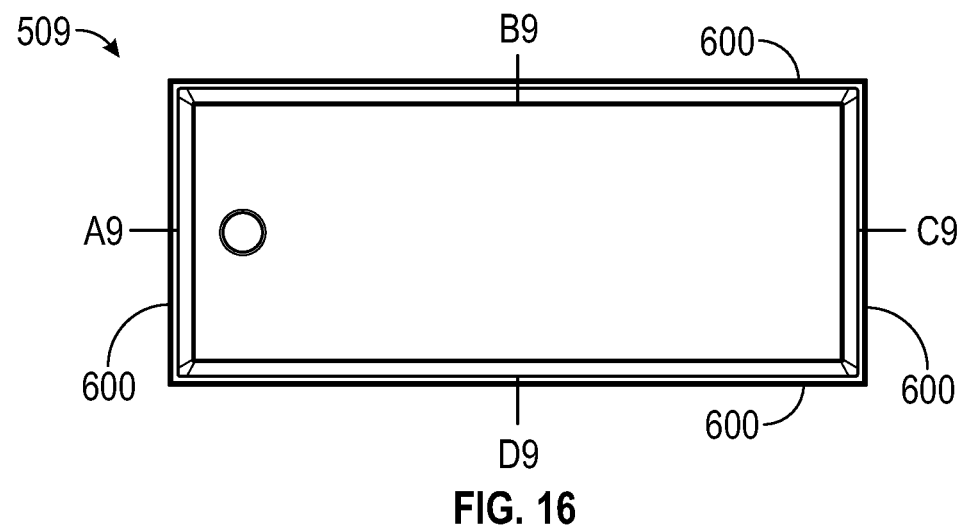
FIG. 16 is a top view of another configuration of the shower receptor of FIG. 1 installed with an apron, according to an exemplary embodiment.

Referring to a ninth configuration 509 shown in FIG. 16, the shower receptor 100 may be installed in an opening with no walls bordering the shower receptor 100. The ninth configuration 509 illustrates a configuration in which side A9, side B9, side C9, and side D9 are each configured to receive an apron 600. Note that the shower receptors described herein (e.g., shower receptor 100) can be installed without any aprons, although each apron increases the structural integrity of the system employing the receptor(s). The shower receptor 100 may also be configured to be installed into any opening (e.g., any geometry, size, number of surrounding walls, etc.).

As utilized herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

The term "or," as used herein, is used in its inclusive sense (and not in its exclusive sense) so that when used to connect a list of elements, the term "or" means one, some, or all of the elements in the list. Conjunctive language such as the phrase "at least one of X, Y, and Z," unless specifically stated otherwise, is understood to convey that an element may be either X, Y, Z; X and Y; X and Z; Y and Z; or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

Although the FIGURES and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of the shower receptor as shown in the various exemplary embodiments is illustrative only. Additionally, any element disclosed in one embodiment may be incorporated or utilized with any other embodiment disclosed herein. For example, the shower receptor of the exemplary embodiment described in at least FIGS. 1-5 may be incorporated in the configurations of the exemplary embodiment described in at least FIGS. 6-7. Although only one example of an element from one embodiment that can be incorporated or utilized in another embodiment has been described above, it should be appreciated that other elements of the various embodiments may be incorporated or utilized with any of the other embodiments disclosed herein.

What is claimed is:

1. A method for installing a receptor in a shower environment, the method comprising:
   measuring a distance between a drain of the shower environment and a wall of the shower environment;
   identifying a marking on the receptor that corresponds to the distance, wherein the marking indicates where to cut the receptor to remove a portion of a rim of the receptor such that an opening in the receptor aligns with the drain when the receptor is installed in the shower environment, and wherein the marking is identified from a plurality of different markings on the receptor, each of the plurality of different markings comprising an indication of a distance between the marking and an axis that passes through the opening to facilitate aligning the opening with the drain of the shower environment when the receptor is installed in the shower environment, each of the plurality of different markings corresponding to a different distance;
   cutting the receptor at a location indicated by the marking; and
   installing the receptor in the shower environment after cutting the receptor at the location indicated by the marking.

2. The method of claim 1, further comprising coupling a flange to the rim of the receptor, the flange providing a watertight seal between the rim and the wall of the shower environment.

3. The method of claim 2, wherein coupling the flange to the rim of the receptor comprises coupling one or more sections of aluminum along an edge of the rim.

4. The method of claim 2, wherein coupling the flange to the rim of the receptor comprises coupling a unitary component comprising two or more linear sections and one or more corners that join the two or more linear sections.

5. The method of claim 1, wherein installing the receptor comprises installing a fluid collection area of the receptor.

6. The method of claim 5, wherein identifying the marking on the receptor comprises:
   identifying a first marking on a first portion of the rim coupled to a first side of the fluid collection area; and
   identifying a second marking on a second portion of the rim coupled to a second side of the fluid collection area.

7. The method of claim 6, wherein cutting the receptor comprises:
   cutting the receptor at a first location indicated by the first marking; and
   cutting the receptor at a second location indicated by the second marking.

8. The method of claim 5, wherein installing the fluid collection area comprises installing a base forming a bottom surface of the fluid collection area that is substantially conical sloping downward toward the opening to bias water toward the opening.

9. A method for installing a receptor in a shower environment, the method comprising:
   measuring a distance between a drain of the shower environment and a wall of the shower environment;
   identifying a marking on the receptor that comprises an indication of the distance, wherein the marking indicates where to cut the receptor to remove a portion of a rim of the receptor, the marking comprising an indication of a distance between the marking and an axis that passes through an opening in the receptor to facilitate aligning the opening with the drain of the shower environment when the receptor is installed in the shower environment;
   cutting the receptor at a location indicated by the marking; and
   installing the receptor in the shower environment after cutting the receptor at the location indicated by the marking.

10. The method of claim 9, further comprising coupling a flange to the rim of the receptor, the flange providing a watertight seal between the rim and the wall of the shower environment.

11. The method of claim 10, wherein coupling the flange to the rim of the receptor comprises coupling one or more sections of aluminum along an edge of the rim.

12. The method of claim 10, wherein coupling the flange to the rim of the receptor comprises coupling a unitary component comprising two or more linear sections and one or more corners that join the two or more linear sections.

13. The method of claim 9, wherein installing the receptor comprises installing a fluid collection area of the receptor.

14. The method of claim 13, wherein identifying the marking on the receptor comprises:
   identifying a first marking on a first portion of the rim coupled to a first side of the fluid collection area; and
   identifying a second marking on a second portion of the rim coupled to a second side of the fluid collection area.

15. The method of claim 14, wherein cutting the receptor comprises:
   cutting the receptor at a first location indicated by the first marking; and
   cutting the receptor at a second location indicated by the second marking.

16. The method of claim 13, wherein installing the fluid collection area comprises installing a base forming a bottom surface of the fluid collection area that is substantially conical sloping downward toward the opening to bias water toward the opening.

17. A method for installing a receptor in a shower environment, the method comprising:
   measuring a distance between a drain of the shower environment and a wall of the shower environment;
   identifying a marking on the receptor that corresponds to the distance, wherein the marking comprises an indication of a distance between the marking and an axis that passes through an opening in the receptor to facilitate aligning the opening with the drain of the shower environment when the receptor is installed in the shower environment;

cutting a rim of the receptor at a location indicated by the marking to change a size of the receptor; and installing the receptor in the shower environment after cutting the receptor at the location indicated by the marking.

18. The method of claim 17, wherein cutting the receptor at the location indicated by the marking causes the opening in the receptor to align with the drain when the receptor is installed in the shower environment.

* * * * *